(12) United States Patent
Zhang et al.

(10) Patent No.: US 10,824,780 B2
(45) Date of Patent: Nov. 3, 2020

(54) METHOD OF TOPOLOGY OPTIMIZATION FOR FLEXIBLE HINGE

(71) Applicant: SOUTH CHINA UNIVERSITY OF TECHNOLOGY, Guangdong (CN)

(72) Inventors: Xianmin Zhang, Guangdong (CN); Min Liu, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 459 days.

(21) Appl. No.: 15/542,080

(22) PCT Filed: Dec. 15, 2016

(86) PCT No.: PCT/CN2016/110211
§ 371 (c)(1),
(2) Date: Jul. 7, 2017

(87) PCT Pub. No.: WO2017/215217
PCT Pub. Date: Dec. 21, 2017

(65) Prior Publication Data
US 2018/0210983 A1    Jul. 26, 2018

(30) Foreign Application Priority Data
Jun. 16, 2016 (CN) .......................... 2016 1 0440183

(51) Int. Cl.
*G06F 30/23* (2020.01)
*G06F 30/18* (2020.01)
(Continued)

(52) U.S. Cl.
CPC ............. *G06F 30/23* (2020.01); *G06F 30/18* (2020.01); *G06F 1/1652* (2013.01); *G06F 2111/06* (2020.01); *G06F 2111/10* (2020.01)

(58) Field of Classification Search
USPC ................................................ 703/2, 1, 6, 5
See application file for complete search history.

(56) References Cited

U.S. PATENT DOCUMENTS

| 8,845,381 B2 * | 9/2014 | Ziegler | ................... | A63H 33/08 446/108 |
| 10,201,736 B2 * | 2/2019 | Tsai | ....................... | A63B 67/00 |

(Continued)

*Primary Examiner* — Thai Q Phan
(74) *Attorney, Agent, or Firm* — JCIPRNET

(57) ABSTRACT

A design method of topology optimization for flexible hinge is disclosed in the invention, comprising following steps: step 1: establishing a design model of topology optimization for flexible hinge, setting an outline of flexible hinge with a typical notch as a shape of design domain and defining a rigid region (non-design domain); step 2: establishing a finite element model of topology optimization for flexible hinge; step 3: establishing a mathematical model of topology optimization problem for flexible hinge based on the finite element model; step 4: calculating a sensitivity of topology optimization problem for flexible hinge; step 5: employing an optimization algorithm to solve the topology optimization problem for flexible hinge, updating a design variable and obtaining a final topology result graph; step 6: according to the final topology result graph obtained by the topology optimization, extracting its outline and obtaining a novel flexible hinge by appropriate modification. Using the method of topology optimization, the invention designs the flexible hinge on a concept level. The novel flexible hinge can be designed with a more complex structure and more excellent performances, having a larger flexibility, a higher precision and a smaller maximum stress.

8 Claims, 3 Drawing Sheets

(51) Int. Cl.
 *G06F 111/06* (2020.01)
 *G06F 111/10* (2020.01)
 *G06F 1/16* (2006.01)

(56) References Cited

U.S. PATENT DOCUMENTS

2008/0184491 A1* 8/2008 Kemper ............. A61G 7/05715
 5/653
2012/0270463 A1* 10/2012 Ziegler .................. A63H 33/08
 446/85
2013/0010405 A1* 1/2013 Rothkopf ............ H04M 1/0216
 361/679.01
2013/0256497 A1* 10/2013 Radmard ............... F16M 11/38
 248/558
2017/0335612 A1* 11/2017 Liu ......................... E05D 15/30

* cited by examiner

METHOD OF TOPOLOGY OPTIMIZATION FOR FLEXIBLE HINGE

CROSS-REFERENCE TO RELATED APPLICATION

This application is a 371 application of the international PCT application serial no. PCT/CN2016/110211, filed on Dec. 15, 2016, which claims the priority benefit of China application no. 201610440183.8, filed on Jun. 16, 2016. The entirety of each of the abovementioned patent applications is hereby incorporated by reference herein and made a part of this specification.

TECHNICAL FIELD

The invention relates to a field of structural design of flexible hinge, and specifically relates to a design method of topology optimization for flexible hinge.

BACKGROUND

A flexible hinge which completes a transmission and a transition of movement and force by using an elastic deformation of itself, is generally processed by wire cutting a piece of board material and is greatly different from a conventional rigid kinematic pair structure. The flexible hinge as the most essential flexible element in a centralized compliant mechanism, its performances make significant influence on the compliant mechanism. Compared with the conventional rigid kinematic pair, the flexible hinge has several advantages such as light weight, zero friction wear, being capable of integration processing and high precision, and it draws extensive attention of scholars home and abroad. The flexible hinge is widely applicable in fields such as precision engineering, instrument measurement, aerospace and micro electro mechanical system (MEMS).

Nowadays, all kinds of notch-type flexible hinge such as circular type, straight-circular type, oval type, corner-filleted type, straight beam type, V type, parabola type, hyperbola type, mixed type and the like, have been widely studied by scholars home and abroad. There are three main performance indexes of flexible hinge: flexibility (or rigidity), rotation precision and stress level. An ideal flexible hinge should have large rotation flexibility, high rotation precision and low stress level. However, owing to the elastic deformation of flexible hinge itself, it is very difficult to meet these three indexes at the same time. For example, among the convention flexible hinges, straight-circular type flexible hinge and V type flexible hinge have a relatively high rotation precision, but small rotation flexibility and very high stress level, which greatly restrict their movement range. Besides, a design method for conventional flexible hinge is mainly depends on experiences of a designer to determine a configuration of flexible hinge. The configuration is very simple and is generally designed as notch type in different shapes. At this moment, the performances of flexible hinge largely depend on experiences of the designer. This makes it difficult to design the flexible hinge with complex configuration and excellent performances.

SUMMARY OF THE INVENTION

An objective of the invention is to overcome problems of prior art, to provide a method of topology optimization for flexible hinge to design a novel flexible hinge, and to enable the flexible hinge to remain a relatively high rotation precision, enhance a rotation flexibility and reduce a maximum stress simultaneously.

In order to realize the above objective, following technical solutions are employed in the invention.

A design method of topology optimization for flexible hinge comprises following steps:

step 1: establishing a design model of topology optimization for flexible hinge, setting an outline of flexible hinge with a typical notch as a shape of design domain and defining a rigid region (a non-design domain);

step 2: establishing a finite element model of topology optimization for flexible hinge;

step 3: establishing a mathematical model of topology optimization problem for flexible hinge based on the finite element model;

step 4: calculating a sensitivity of topology optimization problem for flexible hinge;

step 5: employing an optimization algorithm to solve the topology optimization problem for flexible hinge, updating a design variable and obtaining a final topology result graph;

step 6: according to the final topology result graph obtained by the topology optimization, extracting its outline and obtaining the novel flexible hinge by appropriate modification.

Further, the step of setting an outline of flexible hinge with a typical notch as a shape of design domain in step 1 specifically comprises: setting shapes such as a circle, an oval, a parabola, a hyperbola, a V-shape and the like as the shape of design domain and setting the non-design domain as a rectangle of which height is equal to a height of design domain and length is set as 3 times or more of the height of design domain.

Further, the step of establishing a finite element model of topology optimization for flexible hinge in step 2 specifically comprises: discretizing the design domain and the non-design domain as N finite elements and n finite elements, a relative density of non-design domain being preset as $x_i=1$, and four virtual springs being respectively added in an X and Y direction of input end and an X and Y direction of output end for simulating gaps and reaction forces between the hinge and workpieces.

Further, the step of establishing a mathematical model of topology optimization problem for flexible hinge based on the finite element model in step 3 specifically comprises: a maximum displacement of right midpoint of design domain $U_{y,F_y}$ and a minimum displacement of right midpoint of design domain $U_{x,F_x}$ serving as objective functions, a volume ratio serving as a constraint condition, an optimization mathematical model being shown as below:

$$\min_{x}: f(x) = -w\frac{U_{y,F_y}}{U^0_{y,F_y}} + (1-w)\frac{U_{x,F_x}}{U^0_{x,F_x}}$$

$$\text{s.t.: } Ku_x = F_x$$

$$Ku_y = F_y$$

$$f_v(x) = v^T x \leq V^*$$

$$0 < x_{min} \leq x_i \leq 1, i = 1, 2L, N.$$

Particularly, w represents a weight coefficient, $F_x$ represents a load exerted in an X direction of right midpoint of non-design domain, $F_y$ represents a load exerted in a Y direction of right midpoint of non-design domain, $U_{x,F_x}$ represents the displacement in an X direction of right midpoint of design domain which is generated by an action of load $F_x$, $U_{y,F_y}$ represents the displacement in a Y direction of right midpoint of design domain which is generated by an action of load $F_y$, $U_{x,F_x}^0$ and $U_{y,F_y}^0$ are initial values in an iteration of topology optimization, V* represents the volume ratio, K represents an overall stiffness matrix, $u_x$ represents a displacement field generated by the load $F_x$, $u_y$ represents a displacement field generated by the load $F_y$, N represents a number of finite element, $x_i$ represents the relative density of each finite element and $x_{min}$ represents a minimum relative density which is set as 0.001 generally.

Further, $$U_{x,F_x} = (x_i)^p u_y^T K u_x;\ U_{y,F_y} = (x_i)^p u_y^T K u_y.$$

Further, the step of calculating a sensitivity of topology optimization problem for flexible hinge in step 4 employs a method of adjoint matrix to solve the sensitivities of objective functions and constraint condition, a sensitivity analysis of objective functions is:

$$\frac{\partial f(x)}{\partial x_i} = \frac{w}{U_{y,F_y}^0} p(x_i)^{p-1} u_y^T k_0 u_y - \frac{1-w}{U_{x,F_x}^0} p(x_i)^{p-1} u_y^T k_0 u_x$$

a sensitivity analysis of constraint function is:

$$\frac{\partial f_v(x)}{\partial x_i} = v_i.$$

Further, the optimization algorithm in step 5 can employ a method of optimization criterion (OC) or a method of moving asymptotes (MMA).

Further, the step of according to the final topology result graph obtained by the topology optimization, extracting its outline and obtaining a novel flexible hinge by appropriate modification in step 6 specifically comprises: the outline of design domain of flexible hinge remaining unchanged, by appropriate modification of notches or holes which are obtained by topology optimization, a novel flexible hinge being designed.

Compared with the prior art, beneficial effects of the invention lie in that:

A novel flexible hinge with better performances is obtained by removing a part of material based on a typical notch-type flexible hinge and employing the topology optimization which belongs to a method of concept design to optimally remove a given material. Compared with the flexible hinge before being optimized, the novel flexible hinge obtained in the invention has higher rotation flexibility, higher rotation precision and lower stress level. Besides, among the flexible hinge designed in prior art, a topology configuration of flexible hinge is determined depending on experiences of the designer to great extent, while the configuration of flexible hinge in the invention is changed from a level of topology. A hinge which meets a given requirement can be automatically generated by the method of topology optimization via the given objective functions and constraint condition. The invention provides the design of flexible hinge with a brand new thinking and method of design.

DETAILED DESCRIPTION OF THE PREFERRED EMBODIMENT

Figure 1:
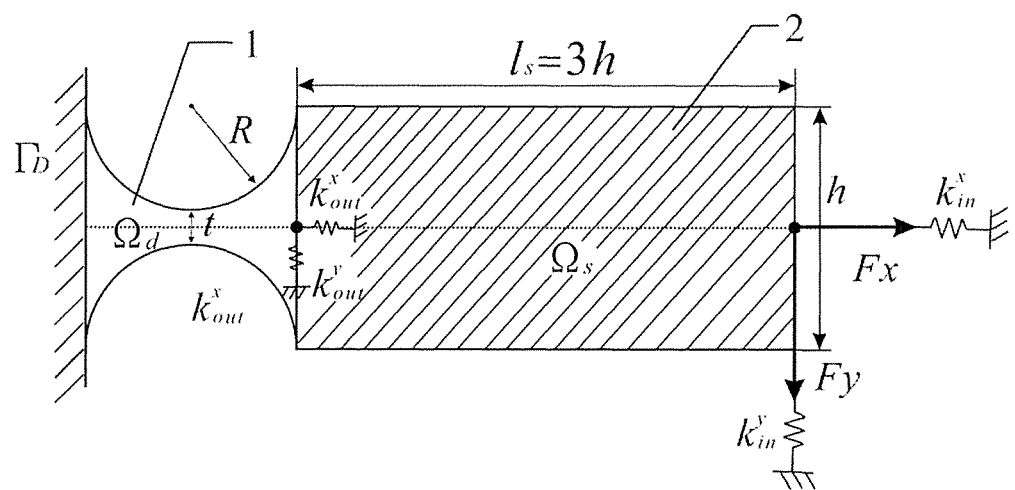
FIG. 1 is a schematic drawing of a design domain and a non-design domain, a size, boundary conditions and loads in an embodiment of method of the invention.

In order to better understanding the invention, it will be further specified below in combination with accompanying drawings of which implementations are not limited thereby.

In accordance with FIGS. 1-4, a design method of topology optimization for flexible hinge specifically comprises following steps:

step 1: establishing a design model of topology optimization for flexible hinge and setting an outline of typical flexible hinge as a design domain. In this embodiment, the outline of a straight-circular type flexible hinge serves as the design domain 1, but the design domains of the invention are not limited thereby. Sizes of design domain 1 and a non-design domain 2 (a rigid component) are defined. A radius R of design domain 1 is set as 40 mm and a minimum thickness t is set as 20 mm. A length of non-design domain $l_s$ is set as 300 mm and a thickness is set as 1 mm.

Step 2: establishing a finite element model of topology optimization for flexible hinge. A Young's modulus of material of design domain 1 and non-design domain 2 is 1 GPa with a Poisson's ratio of 0.3. The design domain is discretized as 80×100 finite elements with a four-node square and the non-design domain is discretized as 300×100 finite elements with the four-node square. A relative density of each finite element $x_i$ ($0 \le x_i \le 1$) serves as a design variable. Owing to the non-design domain serving as a rigid region, the relative density of non-design domain is preset as 1. Loads are exerted in a right midpoint of non-design domain that $F_x$=50N and $F_y$=1N. A virtual output spring is added in a right midpoint of design domain 1 and a spring stiffness is set as $k_{out}^x = k_{out}^y = 1$. A virtual input spring is added in a right midpoint of non-design domain and the spring stiffness is set as $k_{in}^x = k_{in}^y = 1$. Displacement fields $u_x$ (generated by the load $F_x$) and $u_y$ (generated by the load $F_y$) are obtained by a solution.

Step 3: establishing a mathematical model of topology optimization problem for flexible hinge based on the finite element model. Firstly, $U_{x,F_x}$ is defined as a displacement in an X direction of right midpoint of design domain which is generated by the load $F_x$:

$$U_{x,F_x} = (x_i)^p u_y^T K u_x;$$

$U_{y,F_y}$ is defined as the displacement in a Y direction of right midpoint of design domain which is generated by the load $F_y$:

$$U_{y,F_y} = (x_i)^p u_y^T K u_y.$$

An ideal flexible hinge should have relatively large flexibility in a direction of rotation and relatively large rigidity (relatively small flexibility) in a non-desired direction. Therefore, objective functions of topology optimization for flexible hinge are defined as a maximum displacement $U_{y,F_y}$ and a minimum displacement $U_{x,F_x}$. A volume ratio of material serves as a constraint condition. The mathematical model of topology optimization problem for flexible hinge is shown as below:

$$\min_x: f(x) = -w \frac{U_{y,F_y}}{U_{y,F_y}^0} + (1-w) \frac{U_{x,F_x}}{U_{x,F_x}^0}$$

$$\text{s.t.: } K u_x = F_x$$

$$K u_y = F_y$$

$$f_v(x) = v^T x \leq V^*$$

$$0 < x_{min} \leq x_i \leq 1, i = 1, 2L, N.$$

Particularly, w represents a weight coefficient, $F_x$ represents the load exerted in an X direction of right midpoint of non-design domain, $F_y$ represents the load exerted in a Y direction of right midpoint of non-design domain, $U_{x,F_x}$ represents the displacement in the X direction of right midpoint of design domain which is generated by an action of load $F_x$, $U_{y,F_y}$ represents the displacement in the Y direction of right midpoint of design domain which is generated by an action of load $F_y$, $U_{x,F_x}^0$ and $U_{y,F_y}^0$ are initial values in an iteration of topology optimization, $V^*$ represents the volume ratio, K represents an overall stiffness matrix, $u_x$ represents the displacement field generated by the load $F_x$, $u_y$ represents the displacement field generated by the load $F_y$, N represents a number of finite element, $x_i$ represents the relative density of each finite element and $x_{min}$ represents a minimum relative density which is set as 0.001 generally.

Step 4: calculation and analysis of a sensitivity of topology optimization problem, employ a method of adjoint matrix to solve the sensitivities of objective functions and constraint condition. The sensitivity analysis of objective functions is:

$$\frac{\partial f(x)}{\partial x_i} = \frac{w}{U_{y,F_y}^0} p(x_i)^{p-1} u_y^T k_0 u_y - \frac{1-w}{U_{x,F_x}^0} p(x_i)^{p-1} u_x^T k_0 u_x,$$

and the sensitivity analysis of constraint function is:

$$\frac{\partial f_v(x)}{\partial x_i} = v_i.$$

Figure 2:
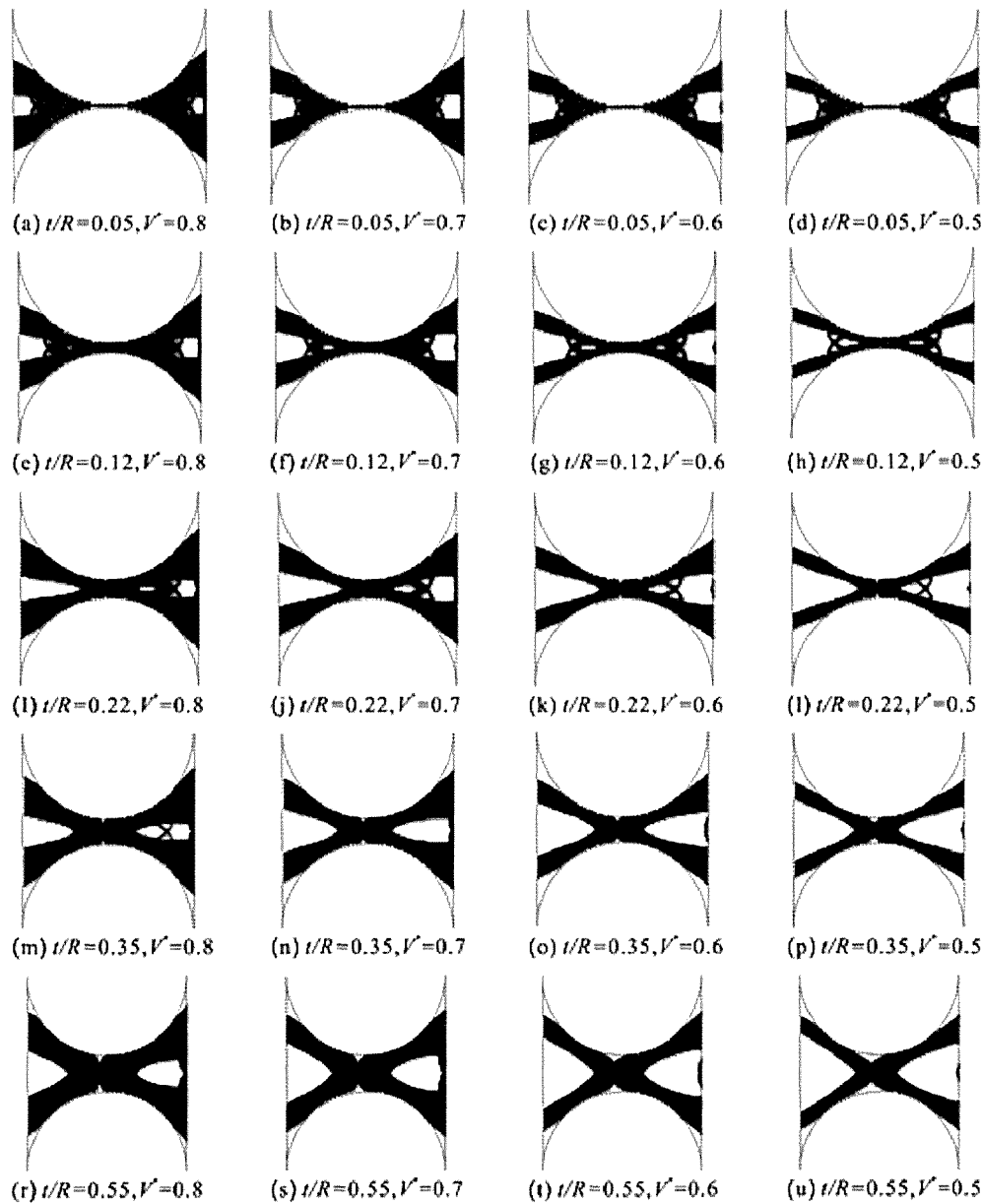
FIG. 2 is a schematic drawing of topology optimization in different parameters in the embodiment of method of the invention.

Step 5: in this embodiment employing a method of optimization criterion (OC) to solve the topology optimization problem for flexible hinge and updating the design variable $x_i$ until a final topology result is obtained by a convergence of iteration. FIG. 2 shows a topology result graph in different volume ratios V* and different ratios of t/R.

Step 6: according to the final topology result graph obtained by the topology optimization, extracting its outline and obtaining the novel flexible hinge by appropriate modification.

A specific novel flexible hinge which is obtained by appropriately processing a topology optimization result graph for flexible hinge is given below, and it is compared with the straight-circular type flexible hinge before being optimized to verify an effectiveness of the invention.

Figure 3:
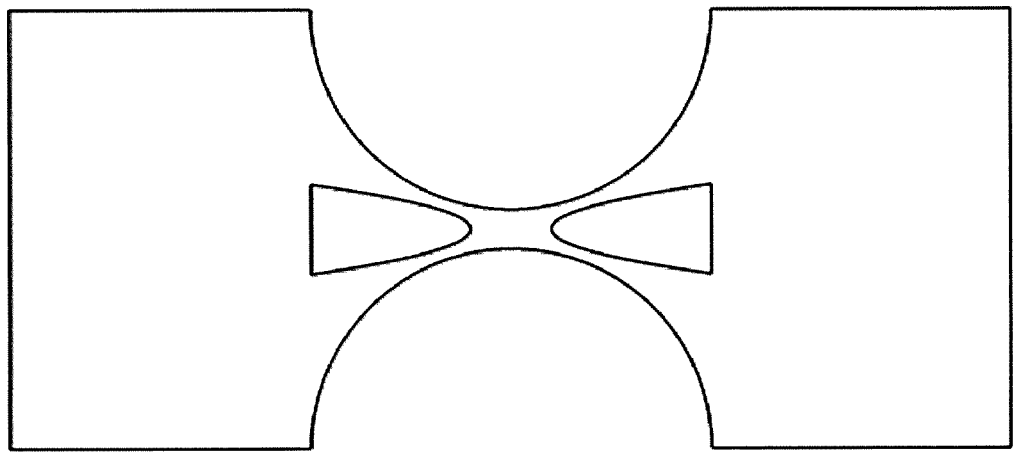
FIG. 3 is a schematic plan drawing of a specific novel flexible hinge obtained in the embodiment of method of the invention.
Figure 4:
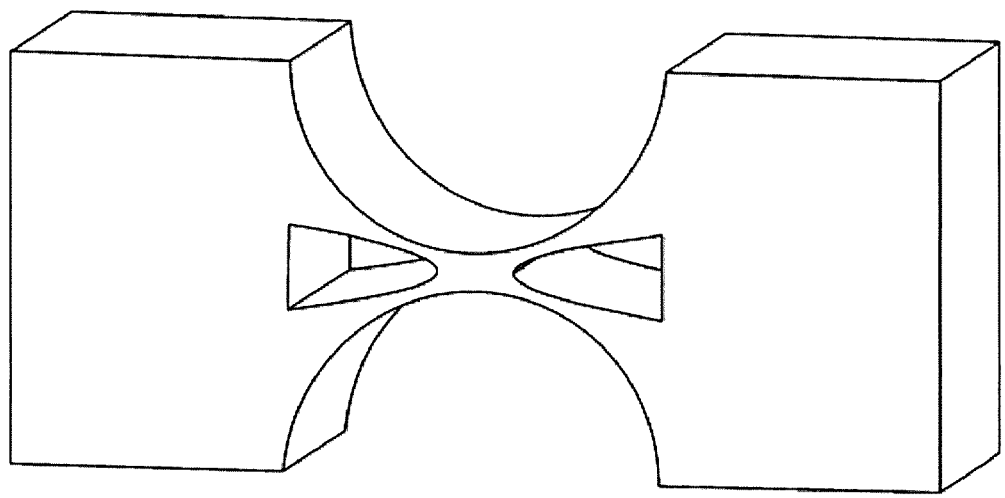
FIG. 4 is a 3D model schematic drawing of a specific novel flexible hinge obtained in the embodiment of method of the invention.

In the embodiment, because a shape of notch of which material is removed, comes the closest to a parabola in the final topology result graph, the shapes of notch at the left and the right of flexible hinge are set as the parabola and a whole hinge is in bilateral and longitudinal symmetry. FIG. 3 shows a schematic plan drawing of a specific novel flexible hinge which is obtained after processing the topology optimization result in the embodiment and FIG. 4 shows a 3D model schematic drawing thereof.

The novel flexible hinge and the straight-circular type flexible hinge obtained in the embodiment are 3D modeled to be imported to a commercial finite element analysis software ANSYS 13.0 to conduct the finite element analysis. Three performances which are rotation flexibility, rotation precision (the smaller the value, the higher the precision) and maximum stress of two hinges are calculated. The maximum stress is compared in a condition of the same slope-deflection ($1.111 \times 10^{-4}$ rad). Comparison results is given in Table 1.

TABLE 1

|  | rotation flexibility (rad/Nm) | rotation precision (1/N) | maximum stress (MPa) |
| --- | --- | --- | --- |
| novel flexible hinge | $1.205 \times 10^{-6}$ | $6.593 \times 10^{-7}$ | 1.9957 |
| straight-circular type flexible hinge | $0.819 \times 10^{-6}$ | $1.056 \times 10^{-6}$ | 2.4581 |

By comparison, it is found that the novel flexible hinge obtained in the invention has larger rotation flexibility, higher rotation precision and lower maximum stress than the straight-circular type flexible hinge, which verifies the effectiveness of the invention.

Finally, it should be declared that above preferred embodiment is only used to specify the technical solution of the invention but not limits the invention. Although the invention is described in detail by above preferred embodiment, a person skilled in the art should understand that various changes can be made in form and in detail and do not deviate from a scope of claims of the invention. Any modifications, equivalent alternatives, improvements and the like made to the invention shall be included within the scope of the invention.

What is claimed is:

1. A method for designing a topology of a flexible hinge comprising:
   step 1: establishing a design model of topology optimization for the flexible hinge, setting an outline of the flexible hinge with a typical notch as a shape of a design domain, and defining a rigid region which is a non-design domain;
   step 2: discretizing the design domain to a plurality of first elements and discretizing the non-design domain into a plurality of second elements, wherein a first density of the first elements of the design domain is a design variable, and a second density of the non-design domain is a preset value;

step 3: establishing a mathematical model of topology optimization problem for the flexible hinge based on the first elements of the design domain by establishing an objective function which is configured to determine an optimal shape of a notch in the flexible hinge to maximize a displacement of a right midpoint of the design domain under a first load exerted in a first direction and to minimize a displacement of the right midpoint of the design domain under a second load exerted in a second direction;

step 4: calculating a sensitivity of the topology optimization problem for the flexible hinge;

step 5: employing an optimization algorithm to solve the topology optimization problem for the flexible hinge by iteratively updating the design variable until the optimal shape of the notch is determined through the objective function, and obtaining a final topology result graph that indicates the optimal shape of the notch; and step 6: according to the final topology result graph obtained by the topology optimization, extracting a new topology of the flexible hinge, wherein the new topology has the notch with the optimal shape, and material of the flexible hinge in the notch is removed to generate a new flexible hinge.

2. The design method of claim 1, wherein the step of setting the outline of the flexible hinge with the typical notch as the shape of the design domain comprises: setting a circle, an oval, a parabola, a hyperbola and a V-shape as the shape of design domain and setting a non-design domain as a rectangle of which height is equal to a height of design domain and length is set as 3 times or more of the height of design domain.

3. The design method of claim 1, wherein a relative density of non-design domain being preset as $x_i=1$, and four virtual springs being respectively added in an X and Y direction of input end and an X and Y direction of output end for simulating gaps and reaction forces between the hinge and workpieces.

4. The method of claim 1, wherein the maximum displacement of the right midpoint of the design domain $U_{y,F_y}$ and the minimum displacement of the right midpoint of the design domain $U_{y,F_x}$ serving as objective functions, a volume ratio serving as a constraint condition, an optimization mathematical model being shown as below:

$$\min_x : f(x) = -w\frac{U_{y,F_y}}{U^0_{y,F_y}} + (1-w)\frac{U_{x,F_x}}{U^0_{x,F_x}}$$

s.t: $Ku_x = F_x$

-continued $Ku_y = F_y$ $f_v(x) = v^T x \le V^*$ $0 < x_{min} \le x_i \le 1, i = 1, 2L, N,$ wherein, w represents a weight coefficient, $F_x$ represents a load exerted in an X direction of right midpoint of non-design domain, $F_y$ represents a load exerted in a Y direction of right midpoint of non-design domain, $U_{x,F_x}$ represents the displacement in an X direction of right midpoint of design domain which is generated by an action of load $F_x$, $U_{y,F_y}$ represents the displacement in a Y direction of right midpoint of design domain which is generated by an action of load $F_y$, $U_{x,F_x}^0$ and $F_y$, $U_{y,F_y}^0$ are initial values in an iteration of topology optimization, $V^*$ represents the volume ratio, K represents an overall stiffness matrix, $u_x$ represents a displacement field generated by the load $F_x$, $u_y$ represents a displacement field generated by the load $F_y$, N represents a number of finite element, $x_i$ represents the relative density of each finite element and $x_{,min}$ represents a minimum relative density which is set as 0.001 generally.

5. The method of claim 4, wherein $$U_{x,F_x} = (x_i)^p u_y^T K u_x; \ U_{y,F_y} = (x_i)^p u_y^T K u_y.$$

6. The method of claim 1, wherein the step of calculating the sensitivity of topology optimization problem for the flexible hinge employs a method of adjoint matrix to solve the sensitivities of objective functions and constraint condition, a sensitivity analysis of objective functions is:

$$\frac{\partial f(x)}{\partial x_i} = \frac{w}{U^0_{y,F_y}} p(x_i)^{p-1} u_y^T k_0 u_y - \frac{1-w}{U^0_{x,F_x}} p(x_i)^{p-1} u_y^T k_0 u_x$$

a sensitivity analysis of constraint function is:

$$\frac{\partial f_v(x)}{\partial x_i} = v_i.$$

7. The design method of claim 1, wherein the optimization algorithm in step 5 employs a method of optimization criterion or a method of moving asymptotes.

8. The method of claim 1, wherein the outline of design domain of flexible hinge remaining unchanged.

* * * * *